United States Patent
Zhu et al.

(10) Patent No.: US 11,288,421 B1
(45) Date of Patent: Mar. 29, 2022

(54) DYNAMIC MODELING METHOD FOR DYNAMIC POWER NOISE SIMULATION

(71) Applicant: Ansys, Inc., Canonsburg, PA (US)

(72) Inventors: Deqi Zhu, Santa Clara, CA (US); Chao Jiao, Canonsburg, PA (US); Yu Lu, Canonsburg, PA (US); Xiaoqin Liu, San Jose, CA (US)

(73) Assignee: Ansys, Inc., Canonsburg, PA (US)

( * ) Notice: Subject to any disclaimer, the term of this patent is extended or adjusted under 35 U.S.C. 154(b) by 222 days.

(21) Appl. No.: 16/569,684

(22) Filed: Sep. 13, 2019

Related U.S. Application Data

(60) Provisional application No. 62/731,171, filed on Sep. 14, 2018.

(51) Int. Cl.
  *G06F 30/20* (2020.01)
  *G06F 111/10* (2020.01)
  *G06F 111/20* (2020.01)

(52) U.S. Cl.
  CPC .......... *G06F 30/20* (2020.01); *G06F 2111/10* (2020.01); *G06F 2111/20* (2020.01)

(58) Field of Classification Search
  CPC ... G06F 30/20; G06F 2111/10; G06F 2111/20
  See application file for complete search history.

(56) References Cited

U.S. PATENT DOCUMENTS

| | | | | |
|---|---|---|---|---|
| 7,902,861 B2* | 3/2011 | Coenen | .............. | H03K 19/0013 326/33 |
| 7,923,974 B2* | 4/2011 | Martin | ................ | H02M 3/1588 323/212 |
| 8,020,130 B2* | 9/2011 | Nagata | ................ | G06F 30/3312 716/115 |
| 10,094,882 B2* | 10/2018 | Kawai | .................. | G01R 31/367 |
| 2003/0203249 A1* | 10/2003 | Bai | ...................... | H01M 8/0488 429/431 |
| 2003/0207159 A1* | 11/2003 | Bai | .................... | H01M 8/04589 429/431 |
| 2004/0184289 A1* | 9/2004 | Vinciarelli | ............ | H02M 7/003 363/15 |
| 2009/0106720 A1* | 4/2009 | Nagata | ................ | G06F 30/3312 716/113 |
| 2015/0073768 A1* | 3/2015 | Kurs | ..................... | G06F 30/367 703/13 |
| 2016/0072518 A1* | 3/2016 | Francis | ............... | H03M 1/0604 341/122 |
| 2019/0064276 A1* | 2/2019 | Kawai | .................... | G06F 30/20 |

OTHER PUBLICATIONS

Apache Design, Inc., "Chapter 9: Characterization Using Apache Power Library," RedHawk User Manual (2019).

\* cited by examiner

*Primary Examiner* — Thai Q Phan

(74) *Attorney, Agent, or Firm* — Jones Day

(57) ABSTRACT

Computationally efficient methods of determining a transient supply current in a circuit are disclosed. The methods include offline simulation of circuit models to obtain time series of signal currents which are used in a dynamic simulation to calculate equivalent capacitances for a cell model of the circuit. The equivalent capacitances may be used in the simulation to compute estimates of noise current in a power distribution network.

20 Claims, 18 Drawing Sheets

DYNAMIC MODELING METHOD FOR DYNAMIC POWER NOISE SIMULATION

CROSS REFERENCE TO RELATED APPLICATIONS

This application claims priority to and the benefit of U.S. Patent Application No. 62/731,171, filed on Sep. 14, 2018, the entirety of which is herein incorporated by reference.

TECHNICAL FIELD

The present description relates to computer-based techniques for dynamically simulating integrated circuits inclusive of power distribution networks for CPU blocks.

BACKGROUND

Computer simulation, which uses mathematical models to replicate the behavior of physical systems, has become indispensable in areas of engineering analysis and design. During integrated circuit design or post-design review/troubleshooting, it is often desirable to analyze the traversal of signals in the integrated circuit to verify that the integrated circuit will behave as intended. For instance, dynamic simulation of power distribution networks (also referred to as "power delivery networks") is a key component of power sign-off in VLSI chip design. Such simulations utilize numerical time integration to solve a dynamical equation representative of the power distribution network.

Conventional methods for performing such simulations can be time consuming and computationally expensive. Simulators such as SPICE, which can be configured to separately model linear elements of a circuit such as resistors, capacitors, inductors, and nonlinear elements such as diodes, BJTs, and MOSFETs, may be impractical in some aspects of VLSI. Simulation of complex networks requires use of circuit models of circuits that can be solved quickly to obtain approximate values for currents and voltages. For example, some integrated circuit simulators provide circuit models termed "cell models" for frequently recurring components. A cell model comprises a black box model of a standard cell coupled to a standardized load model (for example an RC circuit with 2-4 resistance and capacitance parameters) which approximates a portion of a signal net that routes signals via metal connections between pins from a signal output of the standard cell to a further component (for example a further standard cell). Standard cells include frequently-used components (for example powered components receiving power from a power distribution network) such as a component comprising a group of transistors and interconnect structures that provide a Boolean logic function (for example an AND, OR, XOR, XNOR, inverter etc.) or a storage function (for example a flipflop, latch, etc.). One or more instances of the cell model can be generated as needed (for example multiple instances in an overall model of an integrated circuit) based on specific parameters for the load model and the instances configured based on the connectivity of the integrated circuit. Such configured instances of the cell model may simulated for one or more features of the circuit, such as the circuit's interactions with the power distribution network and/or within the signal processing plane of an integrated circuit. Unfortunately, due to the simplifications used to speed up computations, such cell models can overstate key design parameters such as peak noise currents in the power distribution network, resulting in unnecessary overdesign of circuits. For example, a cell model that uses a static capacitive load model can result in predicted peak noise currents that exceed realized values by greater than 100% (for example by up to 300%). More complex models such as SPICE-level models are not computationally viable options in many use cases.

SUMMARY

The present disclosure describes computer-implemented methods and systems for simulation useful in the design of integrated circuits. Certain embodiments may provide, for example, a computer-implemented method for supply currents (for example noise currents induced in a power distribution network) to a circuit. In certain embodiments, for example, the method may comprise deriving (for example interpolating) a time series of signal currents of the circuit from one or more precomputed time series (for example one or more precomputed time series of signal currents obtained from SPICE-level simulations) for the circuit. In certain embodiments, for example, the method may comprise solving a cell model of the circuit using the time series of signal currents as boundary conditions. In certain embodiments, for example, the method may comprise calculating a time series of equivalent capacitances of the cell model (for example a time series of load capacitances associated with a signal net coupled to a powered element of the cell). In certain embodiments, for example, the method may comprise determining a time series of the supply currents based on the time series of equivalent capacitances.

Certain embodiments may provide, for example, a computer-implemented method for supply currents to a circuit, comprising solving a cell model of the circuit using a time series of signal currents as boundary conditions to obtain a series of solutions (for example a series of voltages and currents at node points) to the cell model. In certain embodiments, for example, the method may comprise calculating a time series of equivalent capacitances for the cell model based on the series of solutions. In certain embodiments, for example, the method may comprise applying the time series of equivalent capacitances to compute a sequence of interpolation weights for determining the time series of the supply currents.

Certain embodiments may provide, for example, a computer-implemented method for supply currents to a circuit, comprising: i) deriving (for example interpolating) a time series of signal currents of the circuit from one or more precomputed time series (for example precomputed time series of signal currents obtained from SPICE-level simulations) for the circuit; ii) solving a cell model of the circuit using the time series of signal currents as boundary conditions; iii) calculating a time series of equivalent capacitances of the cell model; and iv) determining a time series of the supply currents based on the time series of equivalent capacitances.

Certain embodiments may provide, for example, computer-implemented method for supply currents to a circuit, comprising: i) solving a cell model of the circuit using a time series of signal currents as boundary conditions to obtain a series of solutions to the cell model; ii) calculating a time series of equivalent capacitances for the cell model based on the series of solutions; and iii) applying the time series of equivalent capacitances to compute a sequence of interpolation weights for determining the time series of the supply currents.

This section summarizes some aspects of the present disclosure and briefly introduces some preferred embodiments. Simplifications or omissions in this section as well as in the abstract and the title herein may be made to avoid obscuring the purpose of the section. Such simplifications or omissions are not intended to limit the scope of the present disclosure.

The disclosed methods and systems comprise, inter alia, a new and computationally efficient way to more accurately compute dynamic source currents such as noise currents induced in power distribution networks by voltage slew in inputs to powered elements of a circuit. Such currents arise due to various capacitances present in circuits, so an approach in traditionally configured simulators has been to precompute source currents for a matrix of slews and effective capacitances for the circuit. When a specific instance of the circuit is dynamically simulated, the source current is obtained by interpolation of the precomputed results based on the simulation slew and effective capacitance of the circuit instance. This approach, however, ignores that the effective capacitance of a circuit is a dynamic parameter. Traditionally, chip designers have accepted this shortcoming because it was not believed to be computationally feasible to simulate to a level that could resolve the dynamic capacitance. The present methods and systems provide a way to overcome this barrier, comprising pre-simulating both the power distribution network and the signal net (for example at a SPICE-accurate level) and storing the resulting signal currents for fast access at simulation runtime. These signal currents can be used to derive boundary conditions to perform nodal analysis on simplified cell models (for example simplified signal nets coupled to a powered element of the cell) of a circuit, enabling computation of a dynamic effective load capacitance for the cell which better represents a better model of capacitance of the cell. This dynamic capacitance may be used at time points of the simulation to obtain dynamic interpolation weights (rather than a single static interpolation weight based on a single load capacitance) into the precomputed source currents.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The disclosed methods and systems have many advantages, including improved estimation of peak source currents. In certain embodiments, for example, the disclosed methods and systems can provide estimated peak source currents (for example estimated peak noise currents in a portion or throughout a power distribution network) having a value of between 75% and 150% of corresponding actual peak currents, for example between 80% and 120%, between 90% and 110%, between 95% and 105%, between 90% and 150%, between 90% and 120% or the disclosed methods and systems can provide estimated peak source currents having a value of between 95% and 115% of corresponding actual peak currents. In certain embodiments, for example, the disclosed methods and systems can provide estimated peak source currents (for example estimated peak noise currents in a portion or throughout a power distribution network) having a value of between 75% and 150% of corresponding peak currents obtained in a SPICE-accurate simulation, for example between 80% and 120%, between 90% and 110%, between 95% and 105%, between 90% and 150%, between 90% and 120% or the disclosed methods and systems can provide estimated peak source currents having a value of between 95% and 115% of corresponding peak currents obtained in a SPICE-accurate simulation.

In addition, the disclosed methods and systems preserve computational efficiency. In certain embodiments, for example, the disclosed methods and systems may increase computing time by less than 200% compared to comparable methods and systems employing a static effective load capacitance in cell models, for example less than 100%, less than 50%, less than 25%, less than 10%, or the disclosed methods and systems may increase computing time by less than 5% compared to comparable methods and systems employing a static effective load capacitance in cell models. In certain embodiments, for example, the disclosed methods and systems may not increase the computing time compared to comparable methods and systems employing a static effective load capacitance in cell models. In certain embodiments, for example, the disclosed methods and systems may increase computing time by between 0% and 200% compared to comparable methods and systems employing a static effective load capacitance in cell models, for example between 25% and 100%, between 25% and 75%, or the disclosed methods and systems may increase computing time by between 0% and 50% compared to comparable methods and systems employing a static effective load capacitance in cell models.

The details of one or more variations of the subject matter described herein are set forth in the accompanying drawings and the description below. Other features and advantages of the subject matter described herein will be apparent from the description and drawings, and from the claims.

DETAILED DESCRIPTION

The present disclosure describes methods that address problems in the calculation of source currents (for example noise currents) in full chip dynamic power analysis. The described methods provide improved estimates of the source currents (for example better estimates of peak source currents) relative to present cell model-based approaches without having to resort to runtime simulation of more rigorous models (for example SPICE-accurate models), which may not be computationally feasible in many cases.

Figure 1:
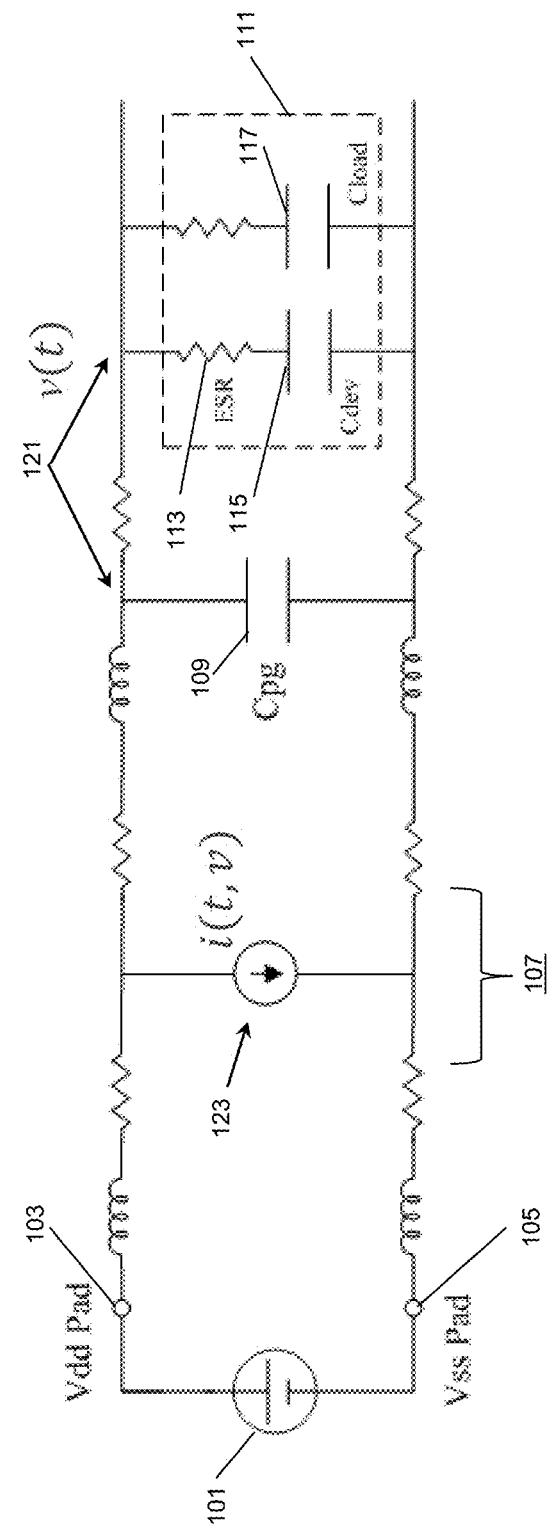
FIG. 1 is a simplified illustration of a power-ground noise current model.
Figure 2B:
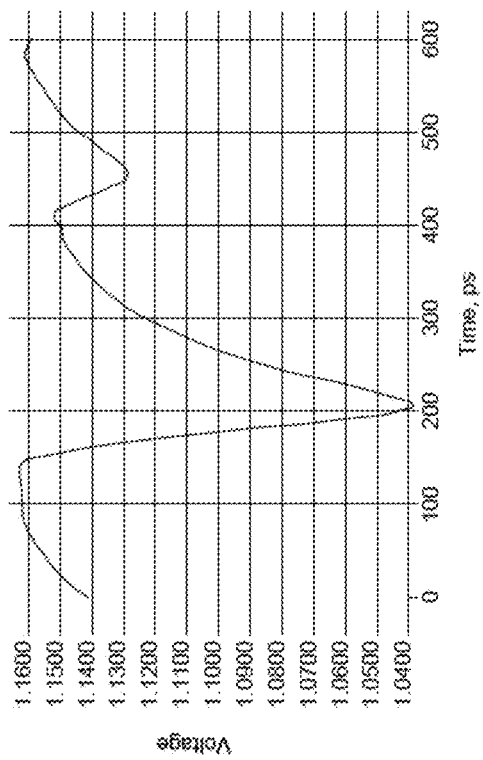
FIG. 2B is an illustration of a simulated voltage response.
Figure 2A:
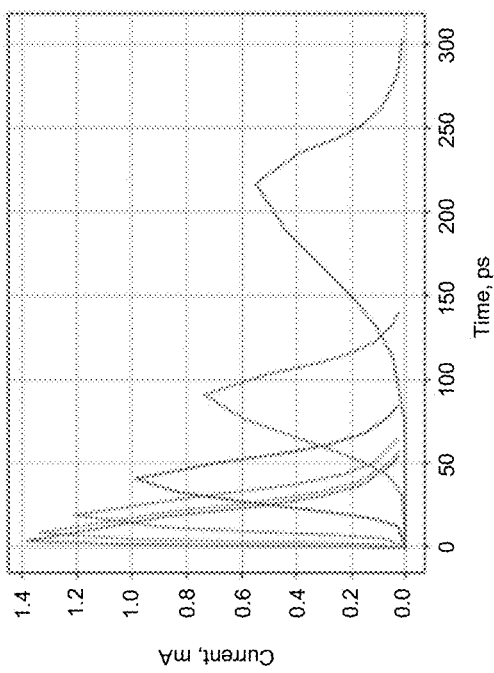
FIG. 2A is a graph of power-ground noise currents for different instances of a cell model.

An exemplary power-ground noise current model 100 is depicted in FIG. 1. A power supply 101 is connected at supply voltage pad 103 and ground voltage pad 105. The model includes various components as shown, inclusive of a switching instance 107, a parasitic capacitance 109 ($C_{pg}$), and a non-switching instance 111 having a one-to-one output that includes an effective series resistance 113 (ESR), device capacitance 115 ($C_{dev}$), and load capacitance 117 ($C_{load}$). In operation, the model can be used in full chip power dynamic analysis to simulate voltage response across elements 121 ($v(t)$) and noise current 123 ($i(v,t)$) associated with a slew of the supply voltage. Exemplary noise current waveforms are depicted in FIG. 2A and an exemplary voltage response is shown in FIG. 2B.

Due to the size and complexity of modern integrated circuits, simulation of power distribution networks in computer-implemented chip design can require simplification of the fine-grained circuitry into an interconnected netlist of course grained cell models based on commonly used components and simplified load models of signal nets connecting the components. Even with this simplification, the resulting cell networks may comprise many thousands, millions, or even billions of cells that interact to simulate the functionality of the integrated circuit. Due to computational limits on the simulation of such large networks, the cell models tend to be simplified black box models of the components connected to simplified representations (for example representations that reduce dozens or hundreds of components into fewer than 10 (for example 1-3) resistors and/or capacitors) for purposes of determining their contribution to phenomena such as noise current in the power distribution network. In certain embodiments, for example, said commonly used components may comprise an Inverter, an Inverting Buffer, an Non-inverting Buffer, a Tri-state Non-inverting Buffer, an AND gate with 2, 3, or 4 inputs, a NAND gate with 2, 3, or 4 inputs, an OR gate with 2, 3, or 4 inputs, a NOR gate with 2, 3, or 4 inputs, an XNOR gate with 2 or 3 inputs, an AND-OR gate, an AND-OR-Inverter, an OR-AND gate, OR-AND-Inverter, a 2-to-1 or 4-to-1 Multiplexer, a 2-to-1 Decoder, a 1 bit Half Adder, a 1 bit Full Adder, a Pos Edge DFF, a Neg Edge DFF, a Scan Pos Edge DFF, a Scan Neg Edge DFF, an RS NAND Latch, a High-Active, a Clock Gating Latch, a Non-inverting Delay line, a Pass Gate, a Bidirectional Switch, a Hold 0/1 Isolation Cell, or a combination of two or more of the foregoing components.

Figure 3:
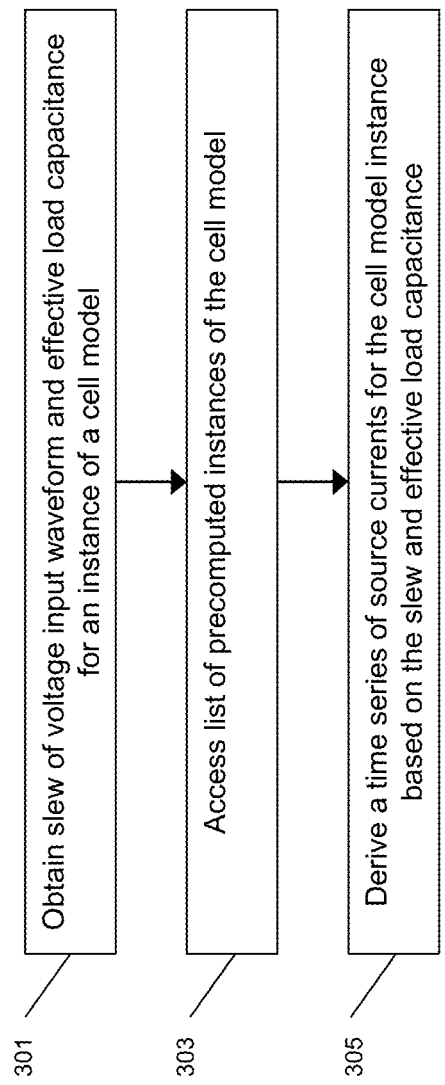
FIG. 3 is a flowchart illustration of a static capacitance method to compute noise current for a cell model of a circuit.

A static capacitance methodology 300 for obtaining a time series of source currents induced in a circuit by input voltage to a powered element of the circuit is illustrated in FIG. 3. In the first step 301, a slew of the input voltage waveform and a fixed effective load capacitance for an instance of a cell model are obtained. The instance of the cell model can be selected based on the types of powered elements and other components to approximate the behavior of the circuit. In the second step 303, a list of precomputed instances of induced currents for the circuit are obtained. The list can be a matrix of precomputed waveforms indexed by discrete values for slew and effective load capacitance. In a third step 305, a time series of source currents for the cell model are derived from the slew and effective load capacitance. The derivation can be performed by interpolating between the precomputed instances of the induced currents using the slew and effective load capacitance to derive interpolation weights. Any of the methods of interpolation described herein may be employed to obtain the interpolation weights.

Figure 4A:
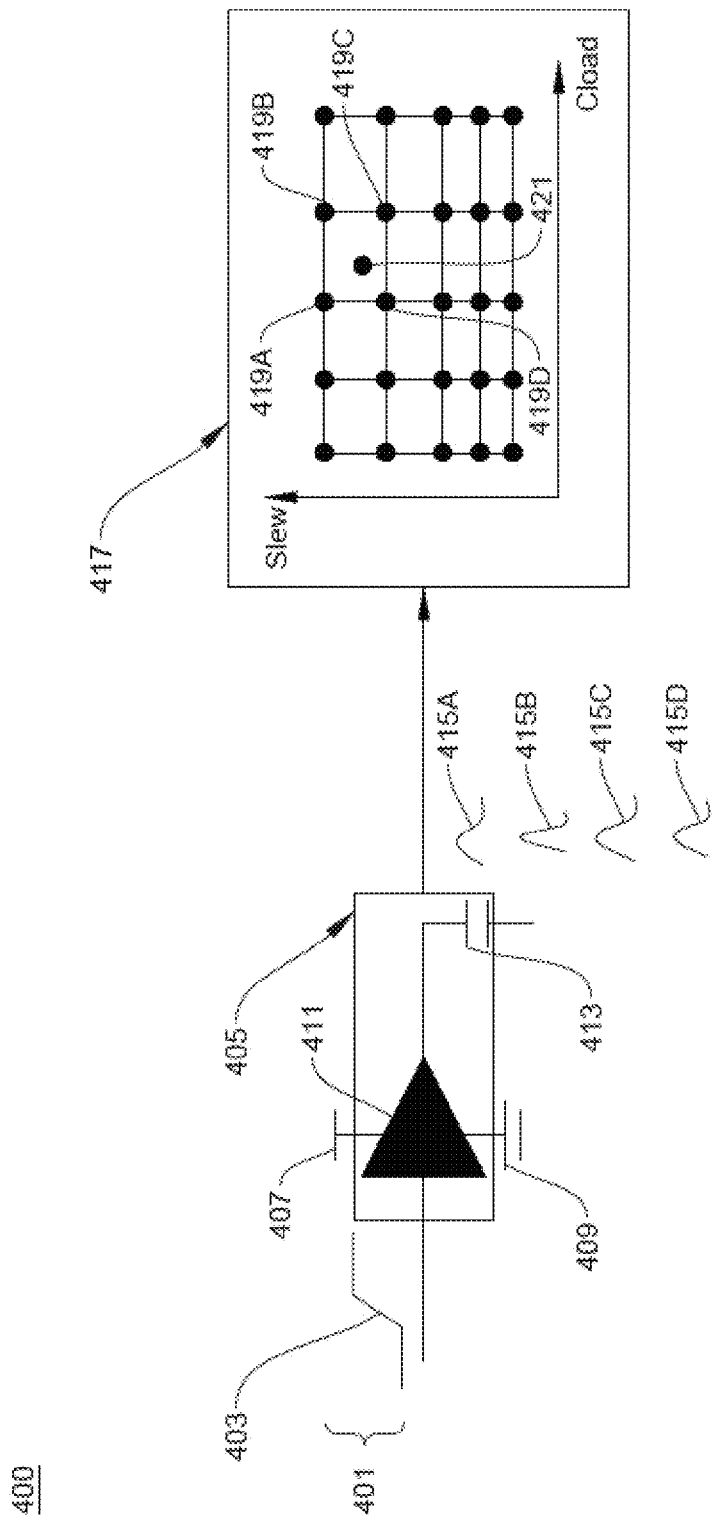
FIG. 4A is an illustration of a static capacitance method to compute cell-level current char.
Figure 4B:
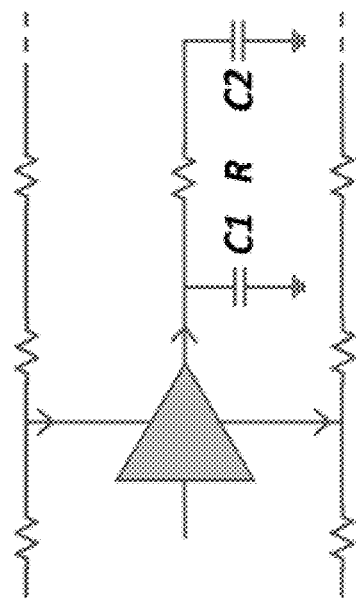
FIG. 4B is a schematic depiction of a three component load model.

An illustration 400 of the static capacitance methodology 300 to obtain a cell-level current char is shown in FIG. 4A. An voltage input 401 having a slew 403 is input to cell model 405 of a circuit in communication with power source 407 (for example a power source associated with a power distribution network) and ground 409 and comprising a powered element 411 and load model 413 (the exemplary load model is a single capacitor having a capacitance value $C_{load}$). Dynamic noise current profiles $I_{VDD}$(slew, $C_{load}$, t) (for example profiles 415A-D) associated with the power source are precomputed for a matrix of slew and effective load capacitance instances and stored in a simulator library 417 (for example the profiles 415A-D are assigned to respective grid points 419A-D matching the corresponding slew and effective load capacitance values). When a dynamic simulation is performed for a real design sample characterized by an instance of a cell model having the three component load model ($C_1$, R, $C_2$) depicted in FIG. 4B, an effective load capacitance $\overline{C}$ for the load model instance is determined and a coordinate 421 (not part of the library) identified in the matrix based on the effective load capacitance $\overline{C}$ and the slew. A time series of dynamic noise currents $I_{VDD}$(slew, $\overline{C}$, t) is determined by identifying adjacent grid points 419A-D and interpolating between the profiles 415A-D. The traditional (static capacitance) method can lead to 100% to 300% pessimism in FinFet devices due, for example, to faster edge rates and R-shielding for large nets.

Certain embodiments may provide a new and computationally efficient methods of computing more accurate source currents (for example noise currents in power distribution networks). The methods may comprise one or more of calculating a time series of equivalent capacitances for an instance of a capacitive load in a cell model. In certain embodiments, for example, the cell model may comprise a model (for example a black box model) of a powered element in communication with the capacitive load model. In a multi-cell simulation, the capacitive load model may represent a portion of a signal net in communication with the powered element. The time series of equivalent capacitances may be computed from a precomputed time series of signal currents applied as boundary conditions in a nodal analysis of the cell model instance, and applying the time series of equivalent capacitances to compute a time series of interpolation weights for determining the time series of supply currents induced in the power distribution network.

Figure 5A:
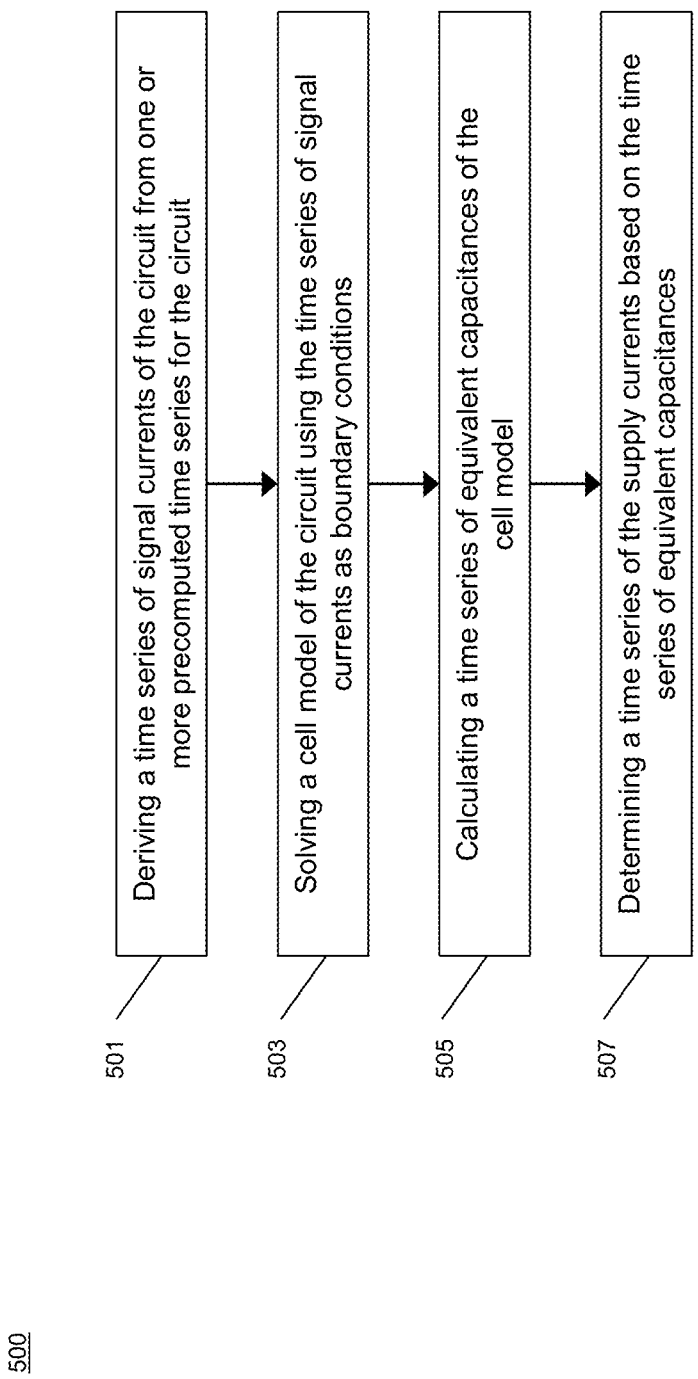
FIG. 5A is a flowchart illustration of a dynamic capacitance method to compute noise current for a cell model of a circuit using a dynamic load capacitance for the cell.

For example, certain embodiments may be based on a computer-implemented methodology 500 for obtaining a time series of source currents induced in a circuit by input voltage as illustrated in FIG. 5A. In a first step 501, a time series of signal currents for the circuit are derived from one or more precomputed time series for the circuit. In certain embodiments, for example, the circuit may comprise a powered element in communication with the input voltage and a power source to produce the signal current. In certain embodiments, for example, the powered element have 2, 3, 4, or 5 or more inputs in any combination with 1, 2, 3, 4, or 5 or more outputs.

In certain embodiments, for example, the supply current may represent one or more of an induced current and a noise current. The supply current may arise, for example, in a power distribution network design where it is desirable to maintain a steady voltage supply while avoiding overdesign of the network.

In certain embodiments, for example, the circuit may be a component of a CPU block. In certain embodiments, for example, the circuit may be a switching or non-switching circuit. In certain embodiments, for example, a component of the circuit may be selected from (or may comprise) a group of components consisting of an Inverter, an Inverting Buffer, an Non-inverting Buffer, a Tri-state Non-inverting Buffer, an AND gate with 2, 3, or 4 inputs, a NAND gate with 2, 3, or 4 inputs, an OR gate with 2, 3, or 4 inputs, a NOR gate with 2, 3, or 4 inputs, an XNOR gate with 2 or 3 inputs, an AND-OR gate, an AND-OR-Inverter, an OR-AND gate, OR-AND-Inverter, a 2-to-1 or 4-to-1 Multiplexer, a 2-to-1 Decoder, a 1 bit Half Adder, a 1 bit Full Adder, a Pos Edge DFF, a Neg Edge DFF, a Scan Pos Edge DFF, a Scan Neg Edge DFF, an RS NAND Latch, a High-Active, a Clock Gating Latch, a Non-inverting Delay line, a Pass Gate, a Bidirectional Switch, a Hold 0/1 Isolation Cell, or a combination of two or more of the foregoing components.

In certain embodiments, for example, the time series of signal currents may be one or more signal currents for one or more outputs of the circuit. In certain embodiments, for example, the time series of signal currents may comprise signal currents for an input to the circuit.

In certain embodiments, for example, the one or more precomputed time series may be obtained from one or more dynamic simulations of the circuit (for example as a part of an overall dynamic simulation of a power distribution network for an integrated circuit) performed prior to the performance of the method. In certain embodiments, for example, the one or more dynamic simulations may comprise a dynamic simulation of a circuit model representing a circuit. In certain embodiments, for example, the circuit model may comprise a SPICE model of the circuit. In certain embodiments, for example, the circuit model may comprise a SPICE model of a powered element of the circuit in combination with a simplified model of a portion of a signal net connected to a signal output of the powered element. In certain embodiments, for example, the simplified model of the portion of the signal net may comprise a reduced-dimensional model containing fewer resistors and capacitors than the portion of the signal net. In certain embodiments, for example, the reduced-dimensional model may be a generic model that comprises 1, 2, 3, or 4 resistors and capacitors (for example 1 resistor and 2 capacitors). In certain embodiments, for example, the circuit model may comprise a non-SPICE model of a powered element of the circuit (for example a model of a powered element that is less complex than a SPICE model) in combination with a generic model of a portion of a signal net connected to a signal output of the powered element. In certain embodiments, for example, the circuit model may be selected from a plurality of available circuit models (for example one of the group of circuit models disclosed above). In certain embodiments, for example, the circuit model may be more rigorous (for example the circuit model may contain a more granular representation of resistances and capacitances) than a cell model of the circuit. In certain embodiments, for example, the one or more dynamic simulations may comprise at one or more voltage input slew (for example a different voltage input slew for a portion or all of the one or more dynamic simulations).

In certain embodiments, for example, the one or more precomputed time series may comprise one or more time series of signal currents. In certain embodiments, for example, the one or more time series of signal currents may comprise one or more SPICE-accurate PG noise current profiles.

In certain embodiments, for example, the one or more precomputed time series may comprise: a first precomputed time series obtained by a first simulation of a first instance of a circuit model. In certain embodiments, for example, the simulation may generate the time series of signal currents in response to at least a first input source voltage, a first input slew rate and first instance parameters for the first instance of the circuit model. In certain embodiments, for example, the first instance parameters may comprise at least a first capacitance. In certain embodiments, for example, the first instance parameters may comprise at least a first resistance. In certain embodiments, for example, the first precomputed time series may be a first precomputed time series of signal currents. In certain embodiments, for example, the one or more precomputed time series may comprise at least two precomputed time series, comprising: at least a second precomputed time series obtained by simulating at least a second instance (for example a second instance having one or more of at least a second slew, at least a second resistance, and at least a second capacitance) of the circuit model.

In certain embodiments, for example, the resulting one or more precomputed time series may be stored (for example in file such as a database) in a nonvolatile storage media. In certain embodiments, for example, the method may further comprise accessing the nonvolatile storage media (for example by reading a file) to obtain the one or more precomputed time series.

In certain embodiments, for example, the deriving may comprise interpolating the time series of signal currents from the one or more precomputed time series, using any of the interpolation techniques described herein. In certain embodiments, for example, an interpolation weight for the interpolating may be based at least on a voltage source input. In certain embodiments, for example, an interpolation weight for the interpolating may be based at least on a slew rate input. In certain embodiments, for example, an interpolation weight for the interpolating may be based at least on an equivalent load capacitance input. In certain embodiments, for example, interpolation (or another method such as curve fitting or smoothing splines) may also be performed in a time dimension if a time point in a dynamic simulation falls between time points of the one or more precomputed time series.

In a second step 503 of the method 500, a cell model of the circuit is solved using the time series of signal currents as boundary conditions. The cell model may be any of the cell models disclosed herein. In certain embodiments, for example, the solving may comprise performing a series of nodal analyses of the cell model at each time step of the time series of signal currents. In certain embodiments, for example, a nodal analysis of the series of nodal analysis uses a signal current value from the time series of signal currents as an input. In certain embodiments, for example, the solving may comprise computing voltages and currents based at least on the signal current value and instance values for one or more of a resistance and a capacitance of the cell model. In certain embodiments, for example, the solving may comprise computing voltages and currents associated with a load model of the cell, which may include models of one or more nets in a signal net.

In certain embodiments, for example, the solving may produce a series of solutions to the cell model corresponding to the time series of signal currents. In certain embodiments, for example, the series of solutions may comprise time series of voltages and time series of currents at nodes of the cell model (for example at each node of the cell model). Nodes of the cell model refer to points where the terminals of two or more cell model elements (such as resistors and capacitors, for example) meet. For example, the series of solutions for a cell with two nodes may comprise two times series of voltages (i.e., a separate time series of voltage calculated for each of the two nodes) and two time series of currents (i.e., a separate time series of currents calculated for each of the two nodes). In certain embodiments, for example, a first solution of the series of solutions corresponding to a first time comprises a first voltage and a first current at a first node of the cell model and a second voltage and a second current at a second node of the cell model.

Figure 5B:
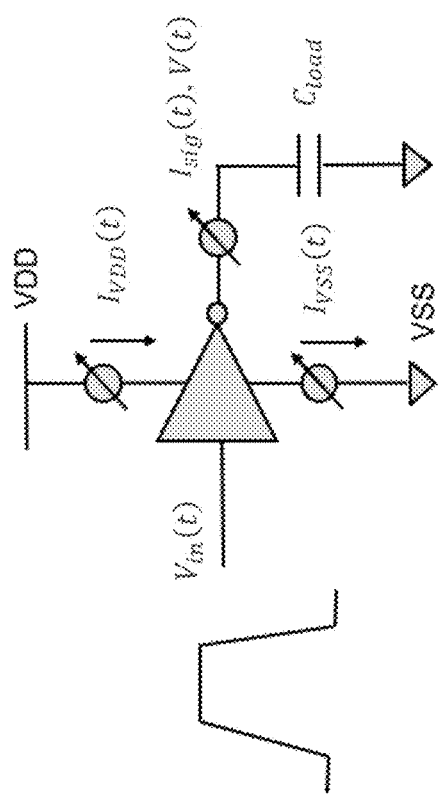
FIG. 5B is a schematic depiction of current and voltage in a cell model.

An illustration of currents and voltages associated with a cell model that includes an inverter standard cell is shown in FIG. 5B. The inverter is connected to a voltage source $V_{in}(t)$, which is a pulse with specified rise and fall slew, a power source VDD and sink VSS. The output of the inverter connects to a capacitor with a specified capacitance $C_{load}(t)$. Inverter switching during operation induces the noise current $I_{VDD}(t)$, sink current $I_{VSS}(t)$, signal current $I_{sig}(t)$ and V(t) as shown.

In a third step 505 of the method 500, a time series of equivalent capacitances of the cell model is calculated. In certain embodiments, for example, the calculating may comprise computing a first equivalent capacitance of the time series of equivalent capacitances based at least on the first voltage, the second voltage, and a first signal current of the time series of signal currents. In certain embodiments, for example, the time series of equivalent capacitances is computing using the time series of voltages and the time series of currents as inputs.

In a fourth step 507 of the method 500, a time series of the supply currents is determined based on the time series of equivalent capacitances. In certain embodiments, for example, the determining may comprise applying the time series of equivalent capacitances to compute a sequence of interpolation weights for determining the time series of the supply currents.

In certain embodiments, for example, the time series of supply currents may be interpolated from two or more time series of precomputed supply currents for the circuit. In certain embodiments, for example, the two of more time series of precomputed supply currents may be differentiated based at least on a capacitance parameter and a slew rate parameter. In certain embodiments, for example, the sequence of interpolation weights may have a one to one correspondence to the time series of equivalent capacitances. In certain embodiments, for example, a first interpolation weight of the sequence of interpolation weights may be computed from a first equivalent capacitance of the time series of equivalent capacitances. In certain embodiments, for example, the computing the first interpolation weight may comprise identifying a lower capacitance value from a discrete set of capacitances and a higher capacitance value from the discrete set of capacitances, wherein the lower capacitance value and the higher capacitance values may be the closest to the first equivalent capacitance among the discrete set of capacitances, wherein the lower capacitance value may be less than the first equivalent capacitance and the higher capacitance value may be higher than the first equivalent capacitance.

In certain embodiments, for example, the time series of signal currents may be derived iteratively for a sequence of instances generated by convergence algorithm for a block of circuits containing the circuit. In certain embodiments, for example, the method may be nested within an iterative strategy for solving an integrated circuit design problem.

Figure 6:
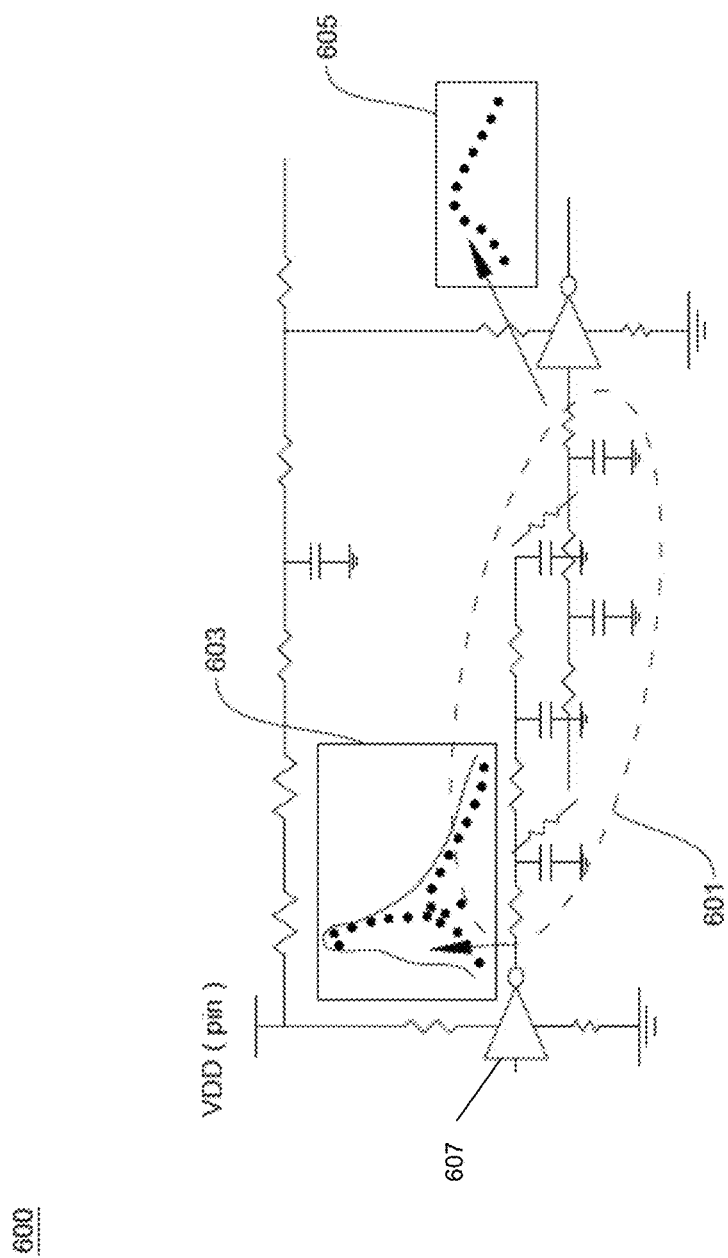
FIG. 6 is an illustration of a dynamic capacitance method to compute dynamic load capacitance.

An illustration 600 of the methodology for runtime computation of a dynamic load capacitance for an instance of a cell model is shown in FIG. 6. A cell model comprising an inverter 607 and a portion of a signal net 601 is provided with an input voltage waveform having a slew. A signal current $I_{sig}(t)$ 603 generated by the instance is derived (based at least on the slew and/or an assigned load capacitance for the instance) from one or more precomputed signal currents. In certain embodiments, for example, the one or more precomputed signal currents may be obtained from one or more prior simulations, such as one or more SPICE-accurate simulations of the inverter coupled at a signal output to a capacitive load. In certain embodiments, for example, the capacitive load may be a single parameter (i.e., a capacitance). In certain embodiments, for example, the capacitive load may have a value of between a minimum capacitive load and a maximum capacitive load (for example as specified by a circuit designer). In certain embodiments, for example, the capacitive load may be sampled from between the minimum capacitive load and the maximum capacitive load (for example by a library characterization tool associated with an integrated circuit simulator). In other embodiments, for example, the capacitive load may be computed from parameters for the cell model (for example by adding parallel capacitances and so forth).

Voltages and currents for the cell model may be determined for each time point in the simulation at each node (for example by nodal analysis) of the portion (or all) of the signal net 601 part of the cell model, or a Pi model thereof, including an output voltage and output current 605 for the cell instance. As shown, said portion of the signal network is modeled by the load model of the cell model. Nodes refer to points of said load model where the terminals of two or more circuit elements (such as resistors and capacitors, for example) are connected. Nodal analysis refers to solving equations for voltages and currents at the nodes, inclusive of node-voltage analysis and branch current methods. Due to the presence of a capacitor, a circuit can become a time-varying system. The nodal analysis naturally requires solution of differential equations associated with storage of charges at the capacitor, in combination with algebraic equations for resistance elements, to obtain solutions of Ordinary Differential Equation (ODE) in time domain, for example, represented by the time series of voltages and currents for the cell model of the circuit.

In certain embodiments, for example, the selected time points of the simulation may correspond to the time points of the time series of signal currents signal current $I_{sig}(t)$ 603. In certain embodiments, for example, values for signal currents used in the simulation may be interpolated from signal current $I_{sig}(t)$ 603 at time points of the simulation. The signal current $I_{sig}(t)$ 603 (or interpolated signal current as the case may be) at each time point of the simulation defines a boundary condition (for example by providing values for some of the currents in the nodal analysis to allow voltage values to be determined). For example, in the case of a node connecting a resistor and a capacitor, the node voltage V(t) may be determined by solving a finite difference approximation of the differential equation for the node voltage V(t):

$$GV(t) + \frac{C}{h}V(t) = I_{sig}(t) + \frac{C}{h}V(t-h)$$

where G is a conductance of the resistor, C is a capacitance of the capacitor, h a time step for the finite difference approximation, $I_{sig}(t)$ is the signal current through the node at time t, V(t) is a voltage at the node at time t, and V(t–h) is a voltage at the node at time t–h. In certain embodiments, for example, the finite difference time step may correspond to a time step of the simulation.

The nodal results may be used to compute an equivalent capacitor for the portion (or all) of the signal net at each time step. As an illustrative, non-limiting example, the current $I_c$ (which may be $I_{sig}(t)$ in certain embodiments) passing through the equivalent capacitor may be integrated to obtain a quantity of stored charge and divided by the voltage at a time T to obtain a capacitance C(T) of the equivalent capacitor at time T:

$$C(T) = \frac{\int_0^T I_C(t)dt}{V(T)}$$

Figure 7:
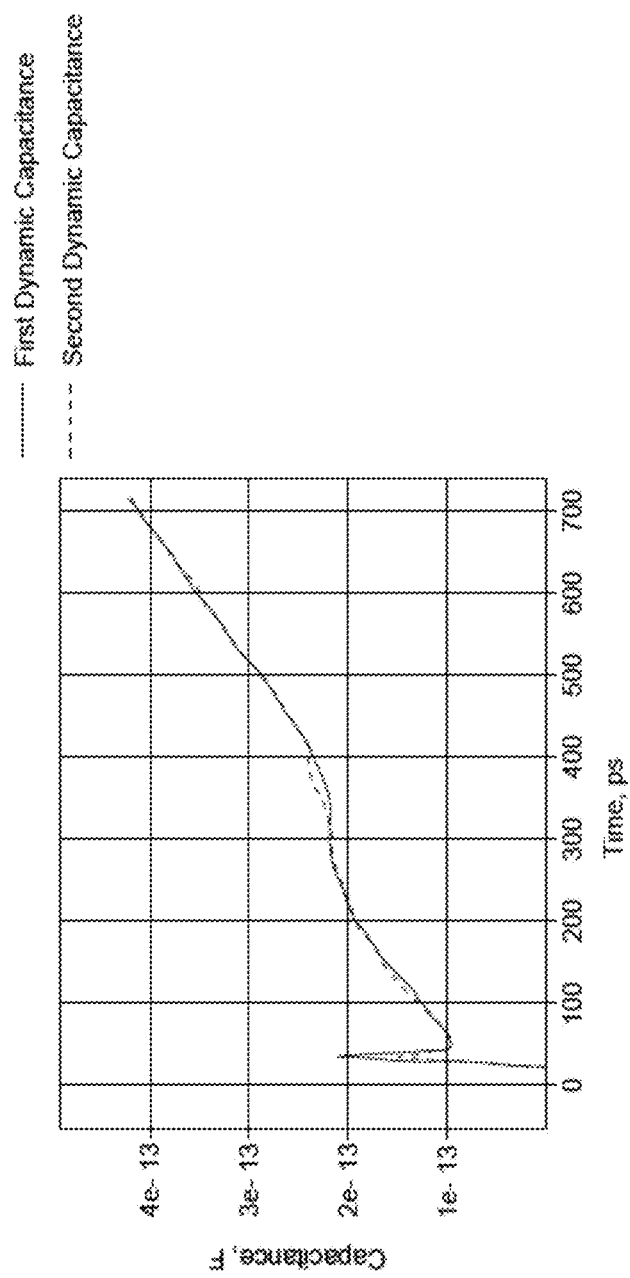
FIG. 7 is a graph of load capacitances computed by the dynamic capacitance method.

The signal currents $I_{sig}(t)$ 603 may be derived (for example interpolated) from a precomputed library (for example a precomputed library containing precomputed time series according to one of the approaches described herein), and the slew may be obtained by Static Time Analysis (STA). Plots of time series of equivalent load capacitances for two instances of the cell model are shown in FIG. 7.

In certain embodiments, for example, a value (e.g. at the current time instance while the circuit is at a steady state) for a signal current of a circuit may be derived (e.g. according to interpolation or other applicable combinations) from one or more precomputed signal currents based on load characteristics (e.g. an equivalent capacitance, a slew of the supply or input voltage, etc.) of the circuit. In certain embodiments, for example, a cell model of the circuit may be solved for load characteristics of the circuit during a simulation time step with the value of the signal current at the current time instance as a boundary condition for solving the cell model. In certain embodiments, for example, the supply current of the circuit may be determined based on the load characteristics of the circuit during the simulation time step.

Figure 8:
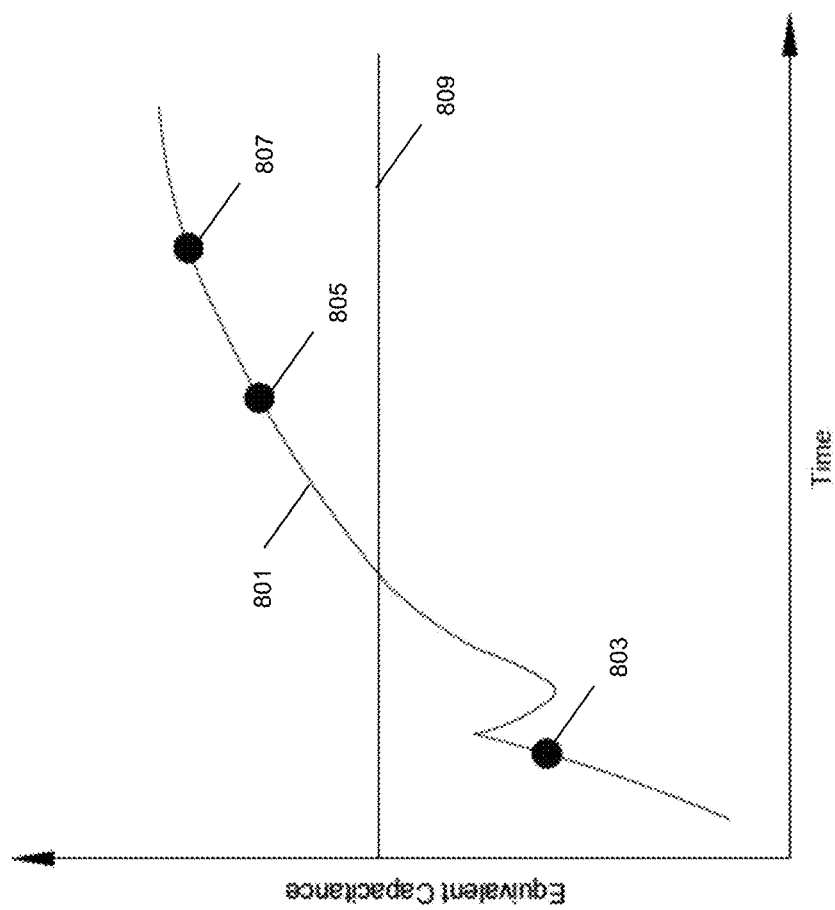
FIGS. 8 and 9 are illustrations of a method to use dynamic load capacitances to compute a source current in a power distribution network.
Figure 9:
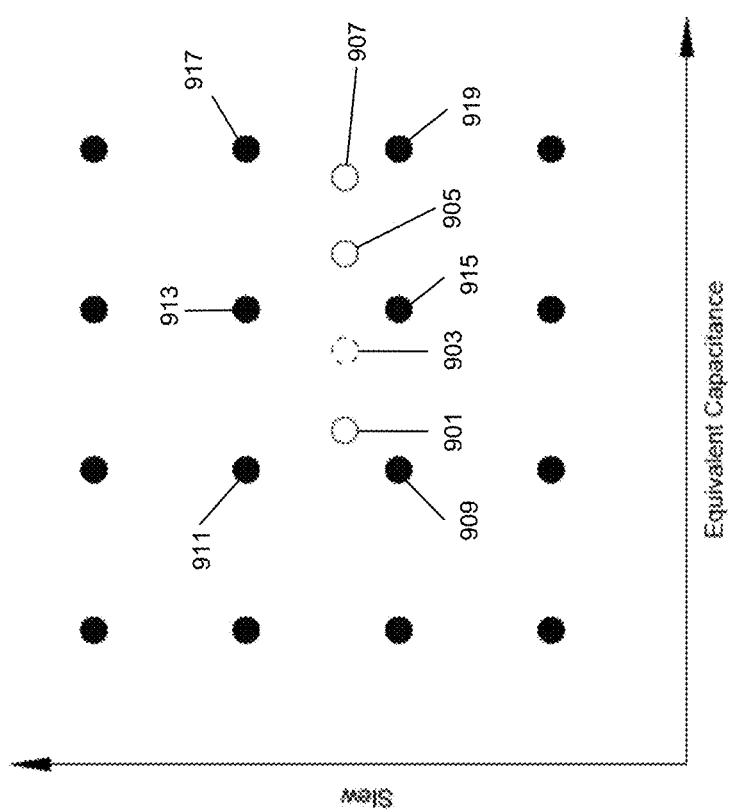

An embodiment that applies the time series of equivalent load capacitances to compute a time series of source currents for an instance of a cell model exposed to an input voltage having a slew S are illustrated in FIGS. 8 and 9. FIG. 8 plots equivalent load capacitance 801 (drawn as a smooth line, but the equivalent capacitances may also be provided as discrete series of data points) for the cell model as a function of time having values $C_1$ at a time $t_1$ (803), $C_2$ at a time $t_2$ (805), and $C_3$ at a time $t_3$ (807), and an average equivalent load capacitance of $\overline{C}$ (809).

FIG. 9 is a plot of a series of grid points indexed by discrete combinations of slew and equivalent capacitance for which precomputed time series of source currents have been obtained, overlaid by coordinates (901, 903, 905, and 907) for $(C_1, S)$, $(\overline{C}, S)$, $(C_2, S)$ and $(C_3, S)$, respectively. A value for the source current $I_{VDD}(t_1)$ at the first time $t_1$ can be obtained by identifying precomputed source current values $I_{VDD}^E(C_u, S_u, t_1)$, $I_{VDD}^F(C_u, S_v, t_1)$, $I_{VDD}^G(C_v, S_v, t_1)$, and $I_{VDD}^H(C_v, S_u, t_1)$ at the first time $t_1$ for adjacent grid points E, F, G, and H (numbered 909, 911, 913, and 915, respectively) having equivalent capacitance and slew values $(C_u, S_u)$, $(C_u, S_v)$, $(C_v, S_v)$, and $(C_v, S_u)$ respectively, and performing bilinear interpolation, giving:

$$I_{VDD}(t_1) = \frac{S_v - S}{S_v - S_u}\left(\frac{C_v - C_1}{C_v - C_u}I_{VDD}^E(C_u, S_u, t_1) + \frac{C_1 - C_u}{C_v - C_u}I_{VDD}^H(C_v, S_u, t_1)\right) + \frac{S - S_u}{S_v - S_u}\left(\frac{C_v - C_1}{C_v - C_u}I_{VDD}^F(C_u, S_v, t_1) + \frac{C_1 - C_u}{C_v - C_u}I_{VDD}^G(C_v, S_v, t_1)\right)$$

The interpolation weights change at times $t_2$ and $t_3$ because the adjacent grid points to coordinates $(C_2, S)$ 905 and $(C_3, S)$ 907 have a different set of adjacent grid points H, G, I, and J (numbered 915, 913, 917, and 919, respectively) with precomputed source current values $I_{VDD}^H(C_v, S_u, t_2)$ $I_{VDD}^G(C_v, S_v, t_2)$, $I_{VDD}^I(C_w, S_v, t_2)$, and $I_{VDD}^J(C_w, S_u, t_2)$, respectively at time $t_2$ and $I_{VDD}^H(C_v, S_u, t_3)$ $I_{VDD}^G(C_v, S_v, t_3)$, $I_{VDD}^I(C_w, S_v, t_3)$, and $I_{VDD}^J(C_w, S_u, t_3)$ at time $t_3$, giving $$I_{VDD}(t_2) = \frac{S_v - S}{S_v - S_u}\left(\frac{C_w - C_2}{C_w - C_v}I_{VDD}^H(C_v, S_u, t_2) + \frac{C_2 - C_v}{C_w - C_v}I_{VDD}^G(C_v, S_v, t_2)\right) + \frac{S - S_u}{S_v - S_u}\left(\frac{C_w - C_2}{C_w - C_v}I_{VDD}^I(C_w, S_v, t_2) + \frac{C_2 - C_v}{C_w - C_v}I_{VDD}^J(C_w, S_u, t_2)\right)$$

$$I_{VDD}(t_3) = \frac{S_v - S}{S_v - S_u}\left(\frac{C_w - C_3}{C_w - C_v}I_{VDD}^H(C_v, S_u, t_3) + \frac{C_3 - C_v}{C_w - C_v}I_{VDD}^G(C_v, S_v, t_3)\right) + \frac{S - S_u}{S_v - S_u}\left(\frac{C_w - C_3}{C_w - C_v}I_{VDD}^I(C_w, S_v, t_3) + \frac{C_3 - C_v}{C_w - C_v}I_{VDD}^J(C_w, S_u, t_3)\right)$$

In the static capacitance method, only $\overline{C}$ is used to compute interpolation weights (and only precomputed current values for grid points E, F, G, and H), whereas in the embodiment $C_1$, $C_2$, and $C_3$ contribute as well as precomputed current values for grid points E, F, G, H, I, and J.

Other approaches to interpolation are contemplated. In certain embodiments, for example, 3, 4, 5, 6, 7 or more grid points by be used to perform the interpolation. In certain embodiments, for example, the interpolation may be a multi-linear interpolation. In certain embodiments the interpolation may be non-linear. In certain embodiments, for example, the grid points by be nodes in a finite element discretization and the interpolation based on a finite element method.

Figure 10:
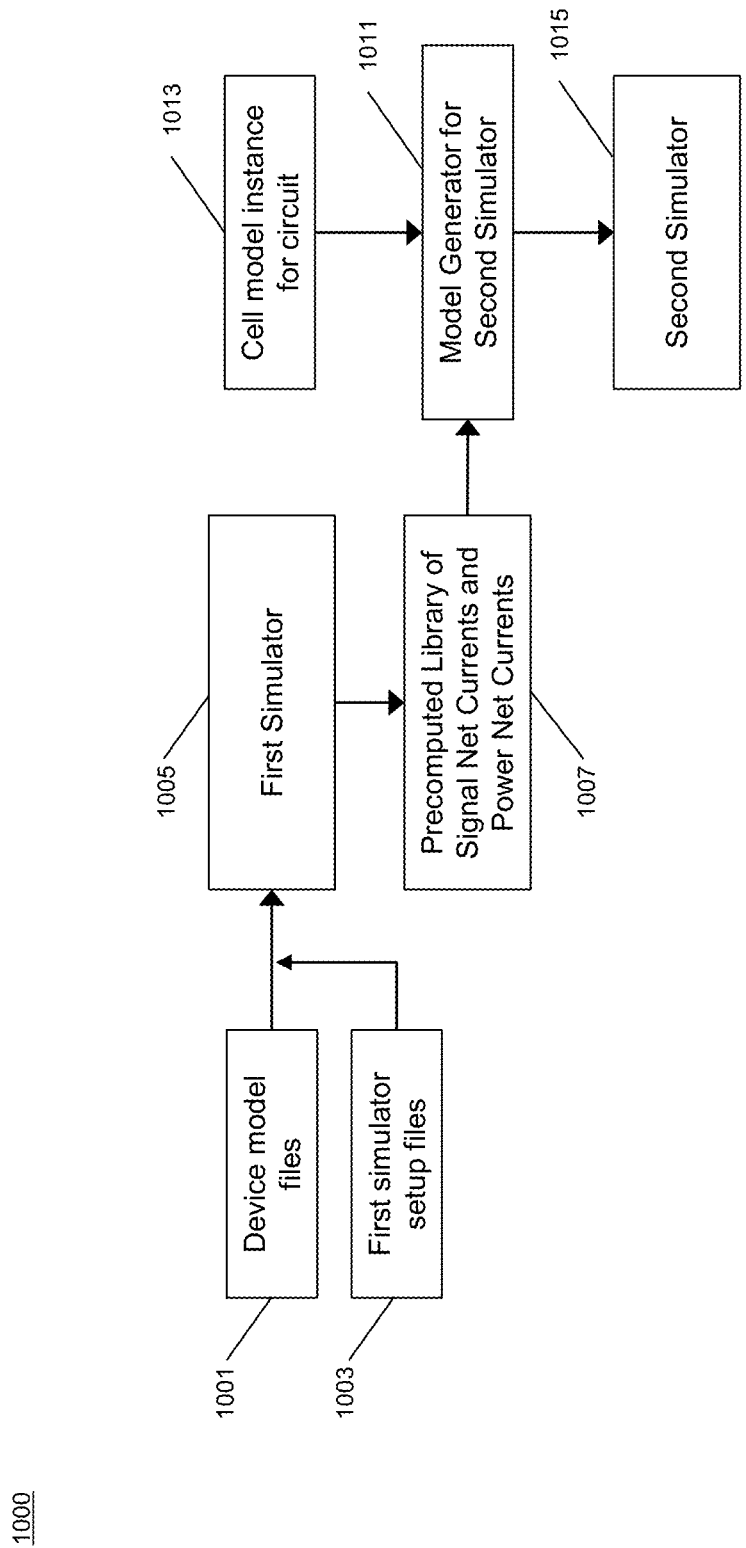
FIG. 10 is a flowchart illustration of a simulator configured to compute power distribution noise current for a cell model of a circuit.

Certain embodiments may provide, for example, one or more circuit simulation tools useful for design of stable, efficient power distribution networks within an integrated circuit. A flowchart 1000 of simulator components is shown in FIG. 10. A first component of the simulator tool 1001 provides device model files (for example Xtor standard cell spice models and device netlist) and a second component of the simulator 1003 provides simulation setup files (for example a SPICE simulation setup) to a third component 1005 comprising a first simulator to precompute signal net currents and precomputed power distribution network currents for the circuit, which are stored as an accessible library in a fourth component 1007 (for example an Apache Power Library comprising a signal current $I_{sig}$(slew, $C_{load}$, t) and a source noise current $I_{VDD}$(slew, $C_{load}$, t). The device model files may include device model files and SPICE netlist file of transistor STD cell. The first simulator setup files may include cell pins nominal voltage setup and cell input vector condition. The precomputations may be performed for all different transitions, different input voltages VDDs, different samples, and different cells. To simulate noise current relative to a circuit, a model generator component for a second simulator (fifth component) 1011 receives a cell model instance model (for example an instance load model such as a $C_1$—R—$C_2$ model of the circuit) from a sixth component 1013 and accesses the stored library 1007 to obtain the precomputed signal net currents and the precomputed power distribution network currents. A generated model is passed to the second simulator (seventh component) 1015 (for example a simulator to perform a Redhawk/Redhawk-SC dynamic simulation) which simulates the cell model instance according to one of the methods disclosed herein and returns computed power distribution network currents for the cell model.

During Redhawk/Rehawk-SC dynamic simulation, for example, a dynamic modeling function may be called to generate current source for a design instance according to event and load RC interconnect fan-out or a $C_1$—R—$C_2$ load model.

While the flowchart 1000 illustrates the requirements for computing the noise current for a single component, a person of ordinary skill in the art will recognize that these components may be applied in a circuit design tool to multiple circuit components in order to simulate part or all of a power distribution network for an integrated circuit having multiple circuit components.

In operation, circuit design tools receive files representative of an integrated circuit design, the integrated circuit design including a plurality of cells and characteristics of power supply and ground paths to each cell. A power analysis of a portion of the integrated circuit design is performed to determine a plurality of power and ground levels within a timing window for each of a plurality of cells. Circuit design tools include SPICE and RedHawk (the latter is commercially available from Apache Design Systems).

The methods and systems described herein may be implemented using any suitable processing system with any suitable combination of hardware, software and/or firmware, such as described below with reference to the non-limiting examples of FIGS. 11A, 11B, 11C, and 12.

Figure 11A:
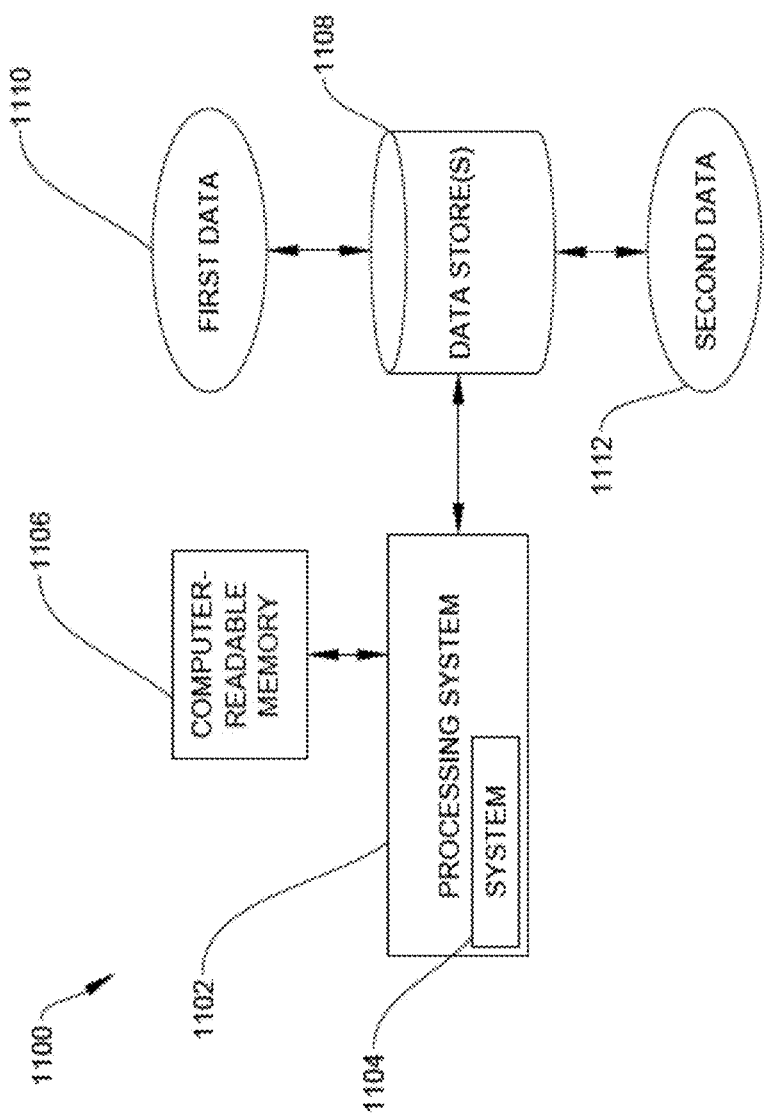
FIGS. 11A-11C and 12 are a schematic depiction of example systems that may be used to implement the technology disclosed herein.
Figure 11B:
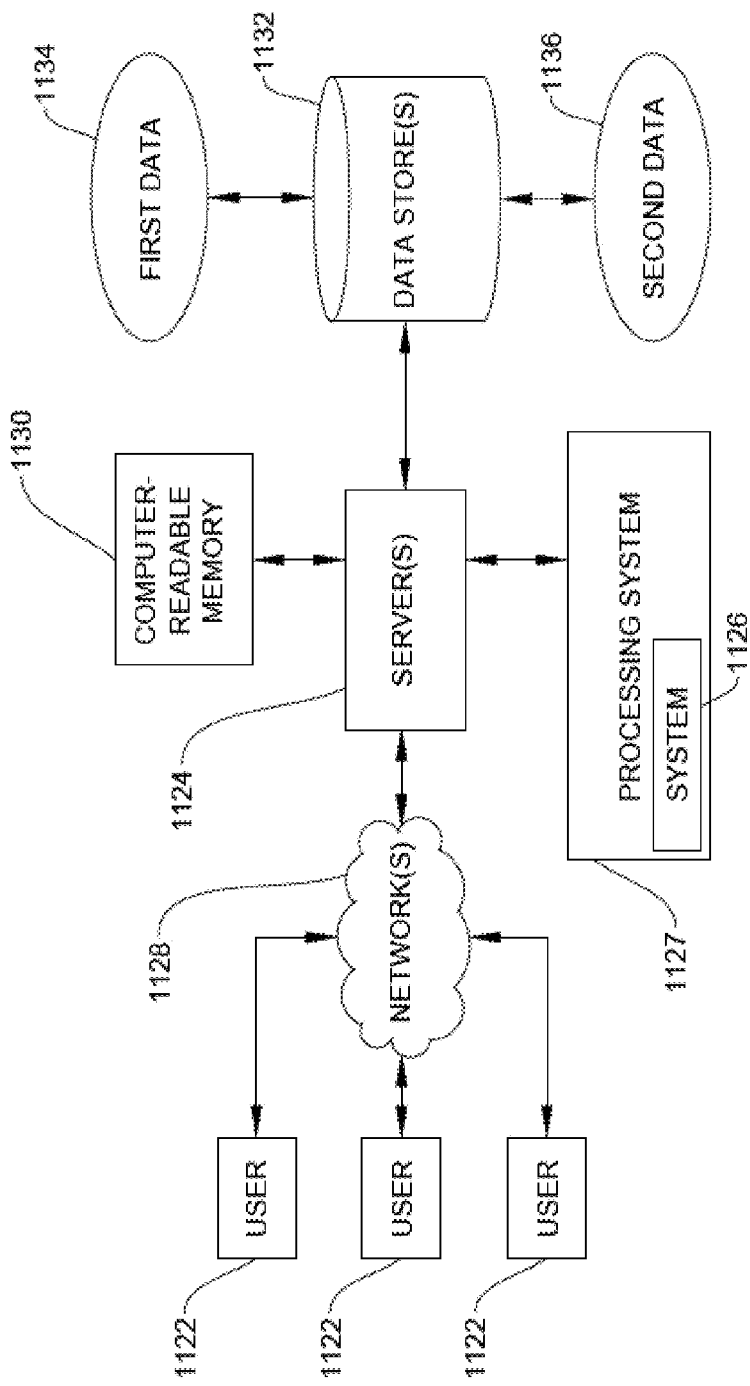
Figure 11C:
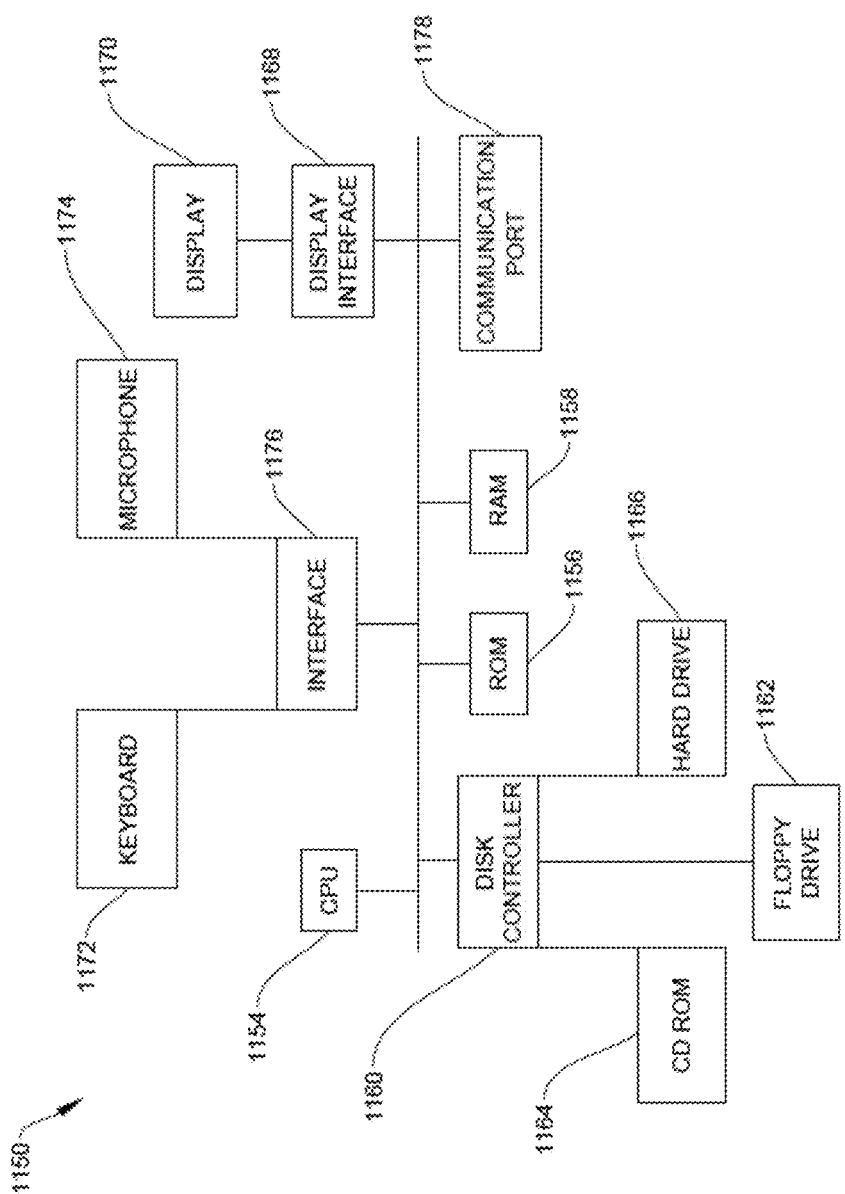

FIGS. 11A, 11B, and 11C depict example systems for use in implementing a system. For example, FIG. 11A depicts an exemplary system 1100 that includes a standalone computer architecture where a processing system 1102 (e.g., one or more computer processors) includes a system 1104 being executed on it. The processing system 1102 has access to a non-transitory computer-readable memory 1106 in addition to one or more data stores 1108. The one or more data stores 1108 may contain first data 1110 as well as second 1112.

FIG. 11B depicts a system 1120 that includes a client server architecture. One or more user PCs 1122 accesses one or more servers 1124 running a system 1126 on a processing system 1127 via one or more networks 1128. The one or more servers 1124 may access a non-transitory computer readable memory 1130 as well as one or more data stores 1132. The one or more data stores 1132 may contain first data 1134 as well as second data 1136.

FIG. 11C shows a block diagram of exemplary hardware for a standalone computer architecture 1150, such as the architecture depicted in FIG. 11A, that may be used to contain and/or implement the program instructions of system embodiments of the present invention. A bus 1152 may serve as the information highway interconnecting the other illustrated components of the hardware. A processing system 1154 labeled CPU (central processing unit) (e.g., one or more computer processors), may perform calculations and logic operations required to execute a program. A non-transitory computer-readable storage medium, such as read only memory (ROM) 1156 and random access memory (RAM) 1158, may be in communication with the processing system 1154 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a nontransitory computer-readable storage medium.

A disk controller 1160 interfaces one or more optional disk drives to the system bus 1152. These disk drives may be external or internal floppy disk drives such as 1162, external or internal CD-ROM, CD-R, CD-RW or DVD drives such as 1164, or external or internal hard drives 1166. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1160, the ROM 1156 and/or the RAM 1158. Preferably, the processor 1154 may access each component as required.

A display interface 1168 may permit information from the bus 1156 to be displayed on a display 1170 in audio, graphic, or alphanumeric format. Communication with external devices may optionally occur using various communication ports 1172.

In addition to the standard computer-type components, the hardware may also include data input devices, such as a keyboard 1172, or other input device 1174, such as a microphone, remote control, pointer, mouse and/or joystick.

Figure 12:
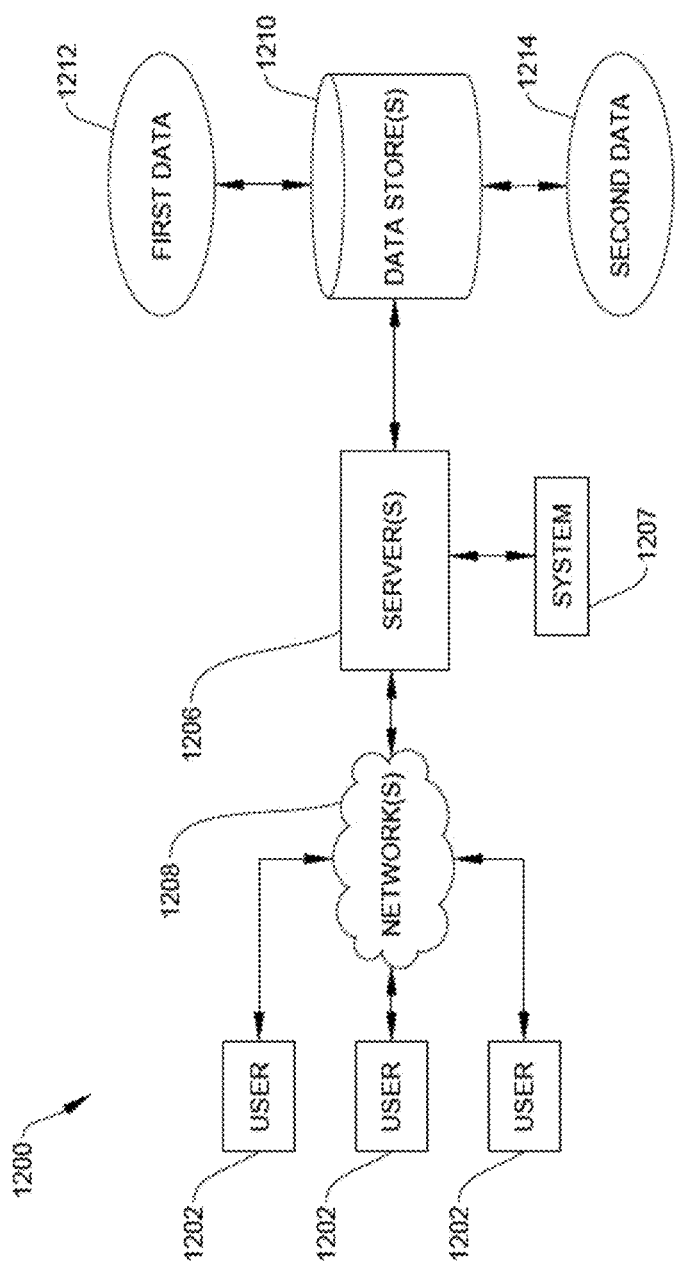

FIG. 12 depicts at 1200 a computer-implemented environment wherein users 1202 can interact with a system 1204 hosted on one or more servers 1206 through a network 1208. The system 1204 contains software operations or routines. The users 1202 can interact with the system 1204 through a number of ways, such as over one or more networks 1208. One or more servers 1206 accessible through the network(s) 1208 can host system 1204. It should be understood that the system 1204 could also be provided on a stand-alone computer for access by a user.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. In particular embodiments, a non-transitory computer- or machine-readable medium may be encoded with instructions in the form of machine instructions, hyper-text markup language based instructions, or other applicable instructions to cause one or more data processors to perform operations. As used herein, the term "machine-readable medium" (or "computer-readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

EXAMPLES

Figure 13B:
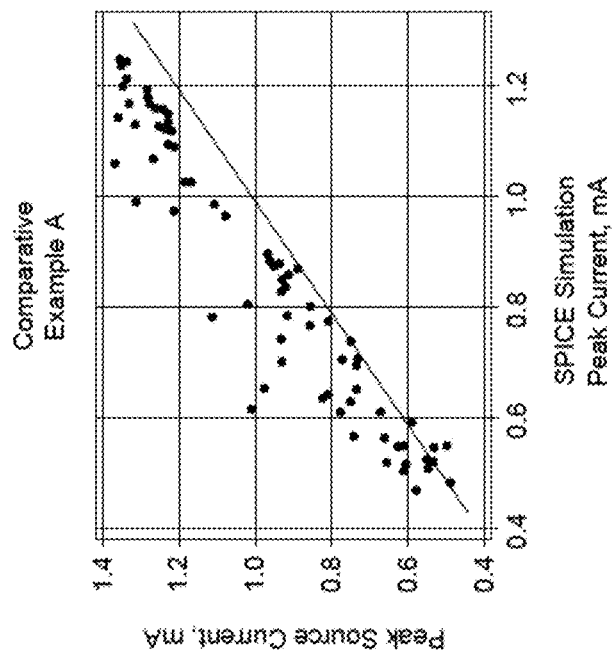
FIGS. 13A and 13B are plots of peak induced noise currents obtained by several computer-implemented methods.
Figure 13A:
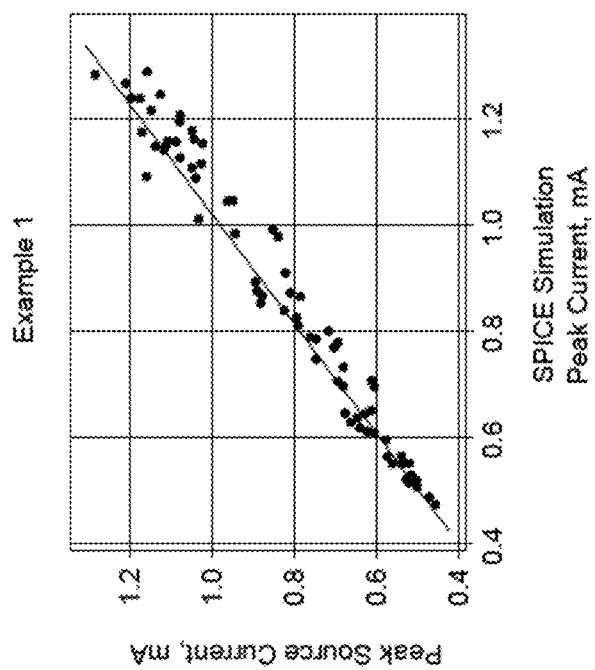

Example 1 and Comparative Example A: In Example 1, a time series of equivalent capacitances were computed for 70 instances of a cell model present in an interconnected power and signal net, the cell model comprising a clock buffer. The equivalent load capacitances were determined based on nodal analysis of portions of the signal nets using SPICE-generated signal currents obtained from an Apache Power Library as boundary conditions, and time series of power distribution network noise currents determined in each instance using the RedHawk simulator. In Comparative Example A, a static equivalent capacitance was assumed and time series of power distribution network noise currents determined for each instance using the RedHawk simulator. Results are shown in FIGS. 13A and 13B.

Figure 14B:
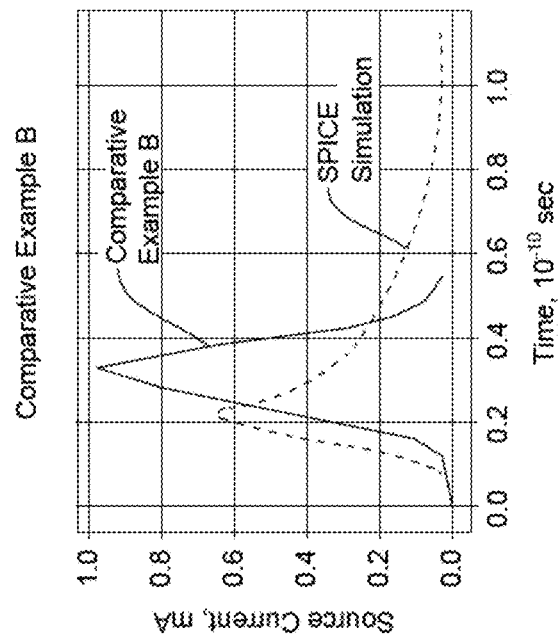
FIGS. 14A and 14B are plots of noise current waveforms obtained by several computer-implemented methods.
Figure 14A:
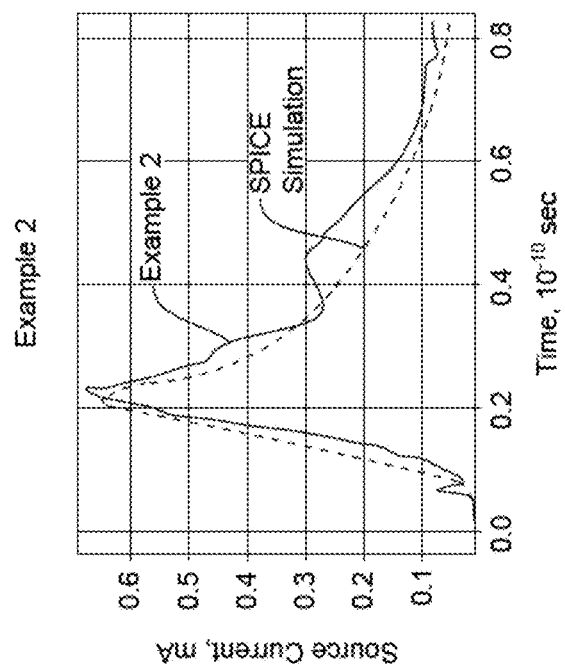

Example 2 and Comparative Example B: In Example 2, a time series of source currents were interpolated from a precomputed matrix of power distribution network noise current profiles for a cell model comprising a clock buffer, wherein a sequence of interpolation weights were generated using a slew rate input and a time series of equivalent capacitances. In Comparative Example B, a time series of source currents were interpolated from a precomputed matrix of source current profiles wherein a sequence of interpolation weights were generated using a slew rate input and a constant effective capacitance. Results with comparison to a SPICE simulation are shown in FIGS. 14A and 14B.

In the descriptions above and in the claims, phrases such as "at least one of" or "one or more of" may occur followed by a conjunctive list of elements or features. The term "and/or" may also occur in a list of two or more elements or features. Unless otherwise Implicitly or Explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in methods, systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for simulating supply currents to a circuit, comprising:
    receiving data comprising one or more precomputed time series for a cell model of the circuit;
    generating, using the received data, a model for dynamic simulation of the circuit by:
        i) deriving a time series of signal currents of the circuit from the one or more precomputed time series for the circuit;
        ii) solving the cell model of the circuit using the time series of signal currents as boundary conditions;
        iii) calculating a time series of equivalent capacitances of the cell model; and
        iv) determining a time series of the supply currents based on the time series of equivalent capacitances;
    passing the generated model for dynamic simulation of the circuit to a software-based simulator; and
    dynamically simulating the circuit using the software-based simulator to result in computed power distribution network currents for the circuit.

2. The method of claim 1, wherein the method is part of a full chip power dynamic analysis.

3. The method of claim 2, wherein the supply currents comprise induced noise currents in a power distribution network.

4. The method of claim 3, wherein the determined supply currents have peak current values of between 90% and 120% of corresponding peak currents obtained in a SPICE-accurate simulation.

5. The method of claim 3, wherein the signal currents are currents in a signal net or a portion of a signal net in communication with the power distribution network.

6. The method of claim 1, wherein the one or more precomputed time series for the circuit are obtained from one or more dynamic simulations.

7. The method of claim 6, wherein the one or more precomputed time series are stored in a library accessible to the method.

8. The method of claim 6, wherein a circuit model used in the one or more dynamic simulations is a more granular representation of the circuit than the cell model.

9. The method of claim 6, wherein the one or more precomputed time series comprises one or more precomputed time series of signal currents for the circuit.

10. The method of claim 9, wherein the one or more precomputed time series is at least four precomputed time series.

11. The method of claim 10, wherein the time series of signal currents are interpolated from the at least four precomputed time series based at least on an input voltage slew and a load capacitance of the cell model.

12. The method of claim 1, wherein the cell model comprises one or more powered elements in communication with a simplified RC model of a net in a signal net.

13. The method of claim 1, wherein the solving comprises performing a series of nodal analyses of the cell model using the time series of signal currents in circuit equations to obtain nodal voltages and currents of the cell model at specified times.

14. The method of claim 13, wherein the calculating comprises computing the time series of equivalent capacitances using a portion or all of the obtained nodal voltages and currents in equations for a capacitor.

15. The method of claim 14, wherein the equivalent capacitances are time-varying equivalent capacitance values for an RC component of the cell model.

16. A computer-implemented method for simulating supply currents to a circuit, comprising:
    receiving data comprising one or more precomputed time series for a cell model of the circuit;
    generating, using the received data, a model for dynamic simulation of the circuit by:
        i) solving the cell model of the circuit using a time series of signal currents as boundary conditions to obtain a series of solutions to the cell model;
        ii) calculating a time series of equivalent capacitances for the cell model based on the series of solutions; and
        iii) applying the time series of equivalent capacitances to compute a sequence of interpolation weights for determining a time series of the supply currents;
    passing the generated model for dynamic simulation of the circuit to a software-based simulator; and
    dynamically simulating the circuit using the software-based simulator to result in computed power distribution network currents for the circuit.

17. The method of claim 16, wherein the time series of supply currents are interpolated from two or more time series of precomputed supply currents for the circuit based on the time series of equivalent capacitances and an input voltage slew.

18. The method of claim 17, wherein the interpolation is a bilinear interpolation.

19. The method of claim 16, wherein interpolation weights in the sequence of interpolation weights vary due to differences between equivalent capacitances in the time series of equivalent capacitances.

20. The method of claim 19, wherein the method comprises repeating one or more of the solving, calculating, and applying.

\* \* \* \* \*